United States Patent
Hendrick et al.

[11] Patent Number: 6,127,657
[45] Date of Patent: Oct. 3, 2000

[54] CLAMPING SOLDERING DEVICE

[75] Inventors: John P. Hendrick, W. Kingston; Michael E. Wheaton, Wakefield, both of R.I.

[73] Assignee: Antaya Technologies Corporation, Cranston, R.I.

[21] Appl. No.: 09/271,670

[22] Filed: Mar. 18, 1999

[51] Int. Cl.[7] .................................................. B23K 3/00
[52] U.S. Cl. ........................ 219/230; 219/221; 219/521; 219/58.1; 228/212; 228/44.3; 228/10
[58] Field of Search .................... 219/230, 227, 219/221, 243, 521, 85.1, 85.16, 85.19; 228/212, 44.3, 45, 10; 251/349; 137/38; 73/37

[56]  References Cited

U.S. PATENT DOCUMENTS

| | | | |
|---|---|---|---|
| 812,329 | 2/1906 | Daugherty . | |
| 1,002,941 | 9/1911 | Sturdevant | 219/85.1 |
| 1,669,846 | 5/1928 | Wenz et al. . | |
| 1,807,004 | 5/1931 | Nelson | 219/234 |
| 2,094,795 | 10/1937 | Johnson . | |
| 2,608,745 | 9/1952 | Barry | 219/85.16 |
| 2,813,191 | 11/1957 | Gray, III | 219/85.1 |
| 3,105,506 | 10/1963 | Beeby | 137/38 |
| 3,230,338 | 1/1966 | Kawecki | 219/85.1 |
| 3,348,753 | 10/1967 | Isbrandt | 228/53 |
| 3,551,640 | 12/1970 | Duke . | |
| 4,316,072 | 2/1982 | Arnoldt | 228/44.3 |
| 4,591,696 | 5/1986 | Eisen | 219/230 |
| 4,594,499 | 6/1986 | Rapsey et al. | 219/221 |
| 5,031,817 | 7/1991 | Chen | 228/20 |
| 5,133,120 | 7/1992 | Kawakami et al. | 29/852 |
| 5,222,649 | 6/1993 | Funari et al. | 228/6.2 |
| 5,234,157 | 8/1993 | Fletcher et al. | 228/219 |
| 5,364,011 | 11/1994 | Baker et al. | 228/180 |

FOREIGN PATENT DOCUMENTS

| | | | |
|---|---|---|---|
| 1101271 | 1/1968 | United Kingdom | 228/212 |

*Primary Examiner*—John A. Jeffery
*Attorney, Agent, or Firm*—Hamilton, Brook, Smith & Reynolds, PC

[57]  ABSTRACT

An air-operated soldering device includes a pair of air cylinders which are operable to clamp a workpiece between the cylinders and a base. A clip holder is then advanced against the workpiece by a clip holder air cylinder. A pair of electrodes are then advanced against the workpiece by a pair of electrode air cylinders, and the electrodes are used to solder electrical contacts to the workpiece. An air operated position sensor is used as a limit switch to determine when the workpiece is properly positioned in the soldering device.

18 Claims, 4 Drawing Sheets

CLAMPING SOLDERING DEVICE

BACKGROUND

Numerous soldering devices have been proposed in the past which have been designed to satisfy particular needs. For example, soldering devices have been used for soldering electrical contacts to a surface, such as a piece of glass having electrical devices embedded or otherwise formed as a part of the glass. Automobile windscreens and other windows have thus been a workpiece to which electrical contacts have been soldered so that the electrical devices in the window, such as an electric defrost element, can be attached to a voltage source.

While these windows and their electrical devices have performed satisfactorily in the past, the soldering devices used to attach electrical contacts to the windows have suffered from numerous shortcomings. For example, prior soldering devices for automobile windows required an operator or user of the device to very precisely align the soldering device on the window, and hold the device while the soldering operation was performed to solder an electrical connector to the window. Because the task of aligning such a soldering device required aligning the device with respect to the target on the window, typically a portion of the electrical device therein, along three axes or degrees of freedom, misalignment rates were high. Misalignment of the soldering device during this process leads to misplaced contacts, misaligned contacts, and/or contacts which have been soldered to the window without the force required to properly connect the electrical contact to the window. Thus, rejection and rework rates have been relatively high, resulting in increased production costs and decreased production rates.

SUMMARY OF THE INVENTION

According to a first exemplary embodiment, a handholdable, air-operable soldering device comprises a base having a first surface, a bracket connected to the base and spaced from the base's first surface, a clamping element mounted to the bracket and moveable toward the base, and a soldering electrode movably mounted to the base.

According to a second exemplary embodiment, a sensor useful as a limit switch comprises a shaft including a sidewall, an exterior surface, and a bore, the bore having a first port and a second port and extending between the first port and the second port, the second port extending through the sidewall at a portion of the shaft having an outer diameter, a shoulder formed in the shaft exterior surface, a cylindrical roller having a bore therethrough, the bore having an inner diameter greater than the shaft outer diameter, the roller slidably positioned around the shaft adjacent to the shoulder and over the portion of the shaft having the outer diameter, the roller bore and the shaft exterior surface forming a space between them, and a restraining element extending from the shaft adjacent to but spaced apart from the roller, the restraining element and the roller forming an air gap therebetween, wherein the air gap, the space, the second port, the shaft bore, and the first port in series form an air passageway through the sensor, and wherein when the roller is pushed by an external force, the roller slides against the second port and at least partially occludes the air passageway.

According to a third exemplary embodiment, a process of soldering an element to a workpiece comprises the steps of positioning a workpiece adjacent to a soldering device, clamping the workpiece to the soldering device, moving the element onto the workpiece, moving a soldering electrode into contact with the element, and soldering the element to the workpiece with the soldering electrode.

The present invention is also directed to a soldering device including a frame having first and second clamping surfaces. The second clamping surface is movable toward the first clamping surface for clamping an object therebetween. A soldering element is movably mounted to the frame and is capable of soldering the object.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Referring to the drawing figures, like reference numerals designate identical or corresponding elements throughout the several figures.

Figure 1:
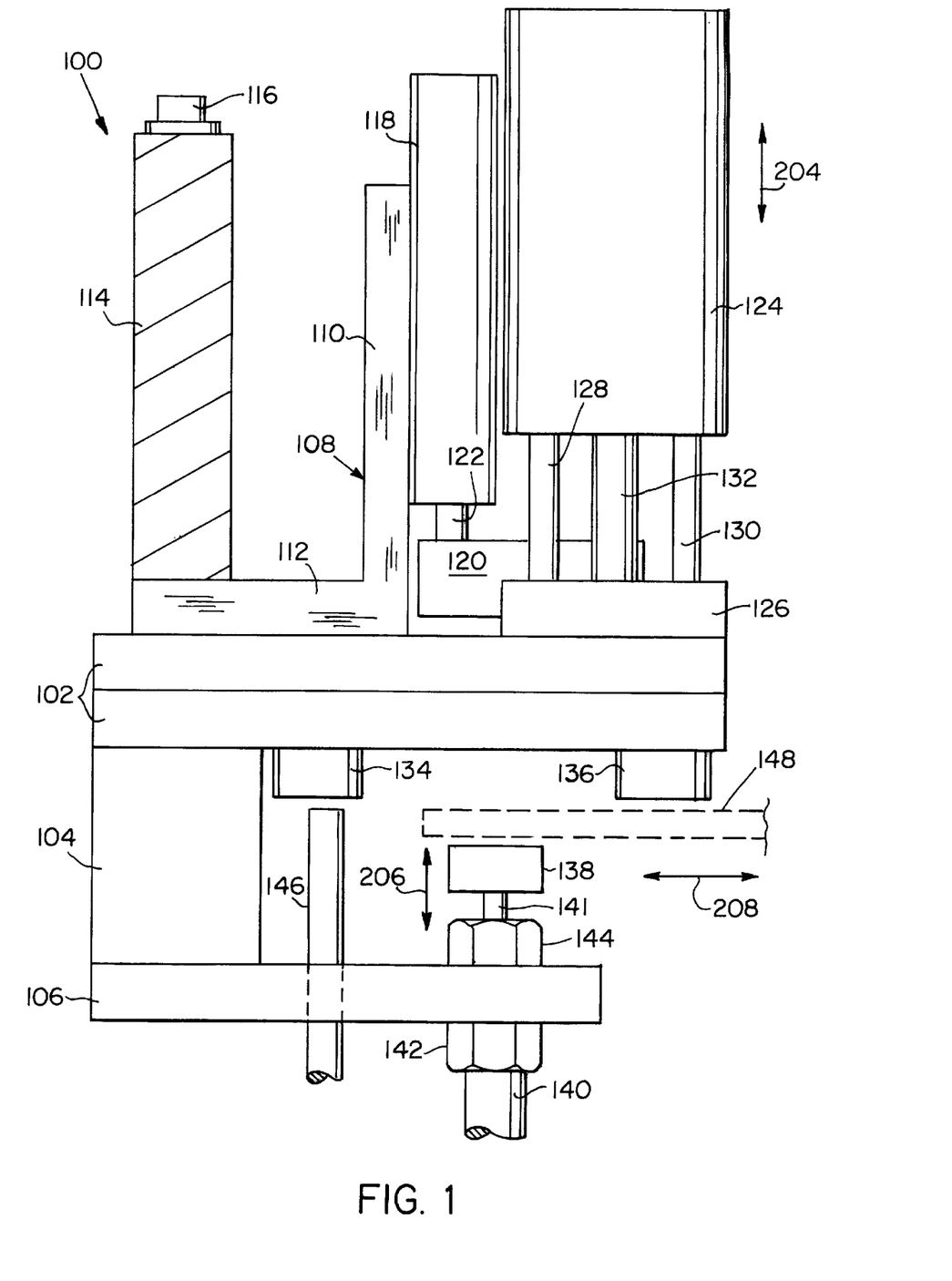
FIG. 1 is an illustration of a side elevational view of a soldering device in accordance with the present invention.

Turning to the drawing figures, FIG. 1 illustrates a side elevational view of a soldering device 100 in accordance with the present invention. Soldering device 100 includes a base 102, which can be formed of one or more plates joined together, and is preferably formed of a phenolic resin. A frame 104 extends down from base 102, to which a bracket 106 is attached. An L-shaped clip piston base 108 is attached to the top of base 102, and includes a vertical leg 110 and a horizontal leg 112. A hand grip 114 is attached to the rear portion of horizontal leg 112, and includes an actuating trigger or button 116 on the top of the hand grip. Button 116 is in electrical communication with other electrical and pneumatic elements of soldering device 100, as described in greater detail below.

A clip holder air cylinder 118 is mounted on the front side of vertical leg 110 of clip piston base 108. A clip shunt bracket 120 is attached to the piston 122 of clip holder air cylinder 118, and is movable vertically by the clip holder air cylinder between a first, upper position, illustrated in FIG. 1, and a second, lower position, where a lower surface of the clip shunt bracket is below the lower surface of base 102, as will be described in greater detail below.

A pair of electrode air cylinders 124, only one of which is illustrated in FIG. 1 because of its view, are mounted to the top surface of base 102 at a mounting plate 126. Electrode air cylinders 124 each include a pair of air cylinder rails or posts 128, 130, along which the air cylinder moves vertically (see arrow 204). Each electrode air cylinder 124 is attached to a soldering electrode 132, which will be described in greater detail with reference to FIG. 2. The positions of electrode 132 and clip shunt bracket 120 are selected so that when the clip shunt bracket is loaded with a clip (not illustrated), which in turn holds one or more electrical contacts to be soldered to a workpiece 148, the electrodes will line up with the clip, and preferably above the clip. Thus, when clip holder air cylinder 118 is actuated to move clip shunt bracket 120 down to place the clip held therein in contact with a workpiece 148, electrode air cylinders 124 can be thereafter actuated to move electrodes 132 down into contact with the clip. This alignment of electrodes 130 and clip shunt bracket 120 allows soldering device 100 to be self-aligning.

Turning back to FIG. 1, the space between base 102 and bracket 106 is a workspace in which workpiece 148 can be inserted. Preferably, workpiece 148 is an automobile windscreen or other window, in which an electrical device is embedded or otherwise formed. Examples of such electrical devices include electric defrosters and antennae. In order to connect these electrical devices to a voltage or signal source or receiver, an electrical contact (not illustrated) must be attached to the workpiece. According to the present invention, these electrical contacts are conveniently preloaded into clips which hold the electrical contacts while being soldered to the workpiece. As illustrated in FIG. 1, workpiece 148 is insertable into and removable from the workspace between base 102 and bracket 106 along the direction indicated by arrow 208.

The bottom surface of base 102 is provided with a number of bumpers 134, 136, which aid in guiding workpiece 148 into position between the base and bracket 106. Preferably, bumpers 134, 136 are formed of a relatively resilient material, such as natural and synthetic rubbers, or softer polymers. A pair of clamp bumpers 138 is mounted to and movable relative to bracket 106 via a pair of clamp air cylinders 140 (see also FIG. 2). Each clamp air cylinder 140 includes a cylinder piston 141 to which clamp bumper 138 is attached, while each clamp air cylinder is mounted to bracket 106 by mounting elements 142, 144, such as nuts.

Clamp air cylinder pistons 141, and therefore clamp bumpers 138, are movable up and down, as indicated by arrow 206, by operation of clamp air cylinders 140 in a manner readily appreciated by one of ordinary skill in the art. The range of motion of clamp bumpers 138, via clamp air cylinders 140, is selected so that the clamp bumpers will engage and clamp against the bottom surface of workpiece 148, therefore clamping the workpiece between the clamp bumpers and bumpers 134, 136 as long as clamp air cylinders 140 are actuated.

One or more position sensors 146 are also mounted in soldering device 100 such that they extend into the space between base 102 and bracket 106. Position sensor 146 functions as a limit switch to provide a control signal to an electrical (either analog or digital) and/or pneumatic controller (not illustrated) for soldering device 100, when workpiece 148 has been moved into engagement with the position sensor. In the embodiment illustrated in FIG. 1, position sensor 146 is fixedly mounted in a slot (not illustrated) in bracket 106 to extend up toward base 102. As will be readily appreciated by one of ordinary skill in the art, each position sensor can alternatively be mounted through base 102 or frame 104 to extend into the space between the base and bracket 106. Each position sensor 146 is mounted in a slot so that the location of the position sensor along the direction of arrow 208 can be tailored to properly sense the presence of a workpiece or set of workpieces to be soldered by soldering device 100, depending on the particular dimensions of the workpiece.

Figure 2:
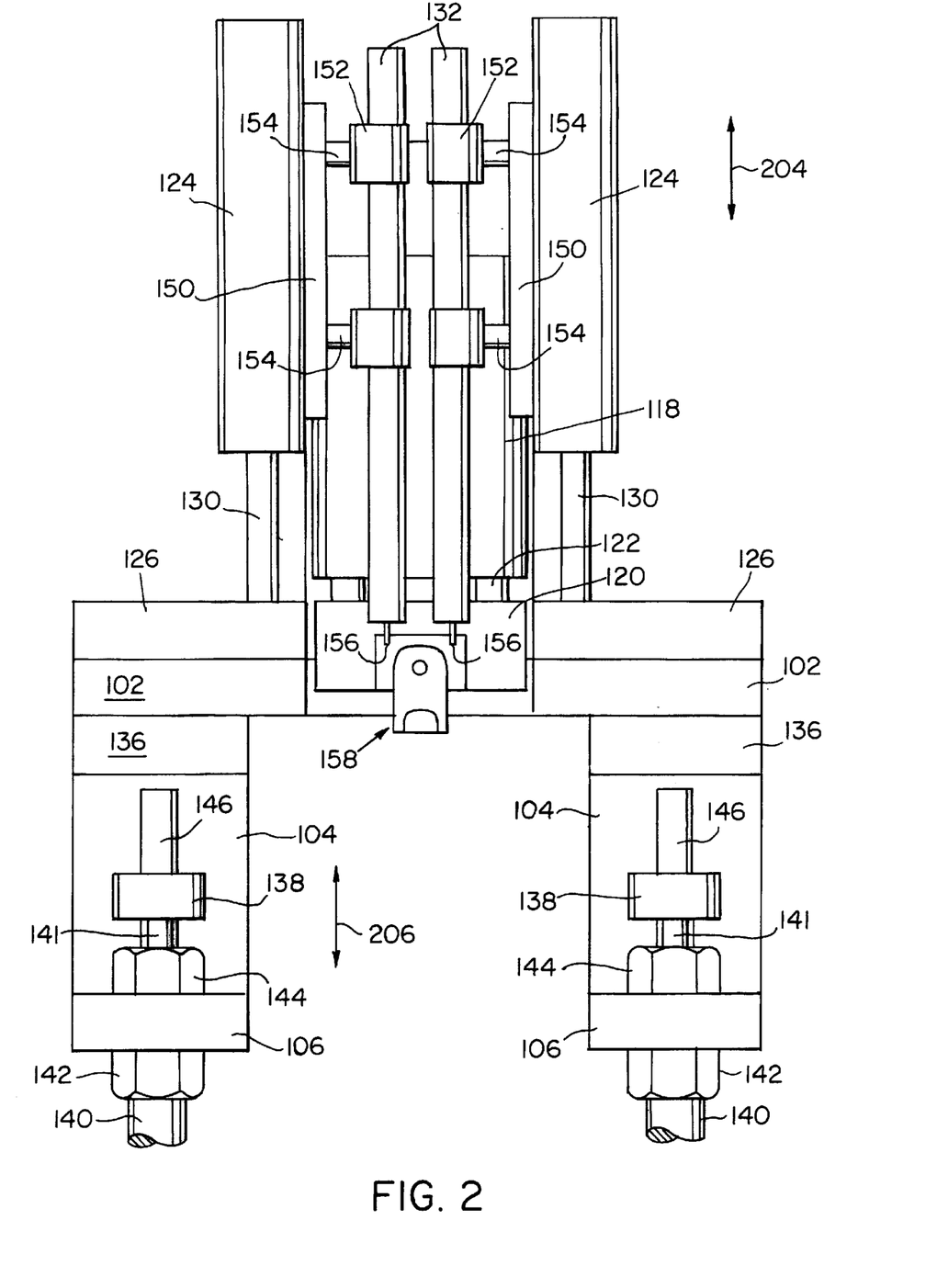
FIG. 2 is an illustration of a front elevational view of the device illustrated in FIG. 1.

Turning now to FIG. 2, a front elevational view of soldering device 100 is illustrated. FIG. 2 illustrates many of the features and elements of soldering device 100 described above with reference to FIG. 1; for the sake of brevity, elements described in FIG. 1 will not necessarily be described again with reference to FIG. 2.

FIG. 2 illustrates the pair of electrode air cylinders 124 separated by a space in which electrodes 132 are located for up and down reciprocal motion along the direction indicated by arrow 204. Electrodes 132 are each mounted to an electrode air cylinder 124 by an electrode holder shell 152 through posts 154 and electrode piston adjusting plates 150. Electrode piston adjusting plates 154 are attached to electrode air cylinders 124, and each electrode piston adjusting plate includes a plurality or a range of positions (not illustrated) for attaching electrode holder shells 152, to allow the positions of electrodes 132 along the direction indicated by arrow 204 to be changed. Electrodes 132 each include an electrode tip 156 at their lower ends, which engage the electrical contacts (described above) when the electrical contacts are soldered to workpiece 148.

A clip shunt 158 is mounted to clip shunt bracket 120, and is mounted so that electrode tips 156 are above and on either side of the clip shunt. Clip shunt 158 is designed to receive a clip (not illustrated) on the bottom of the clip shunt, which clip includes electrical contacts (not illustrated), described above, for attachment to workpiece 148 by soldering. In accordance with the present invention, clip shunt 158 can take one of a number of alternate configurations to receive a clip therein, depending on the particular clip to be received. Suitable clip shunts and clips are available from Antaya Technologies Corporation, of Cranston, R.I. In FIG. 2, the direction indicated by arrow 208 in FIG. 1 extends in and out of the plane of the drawing figure.

Figure 3:
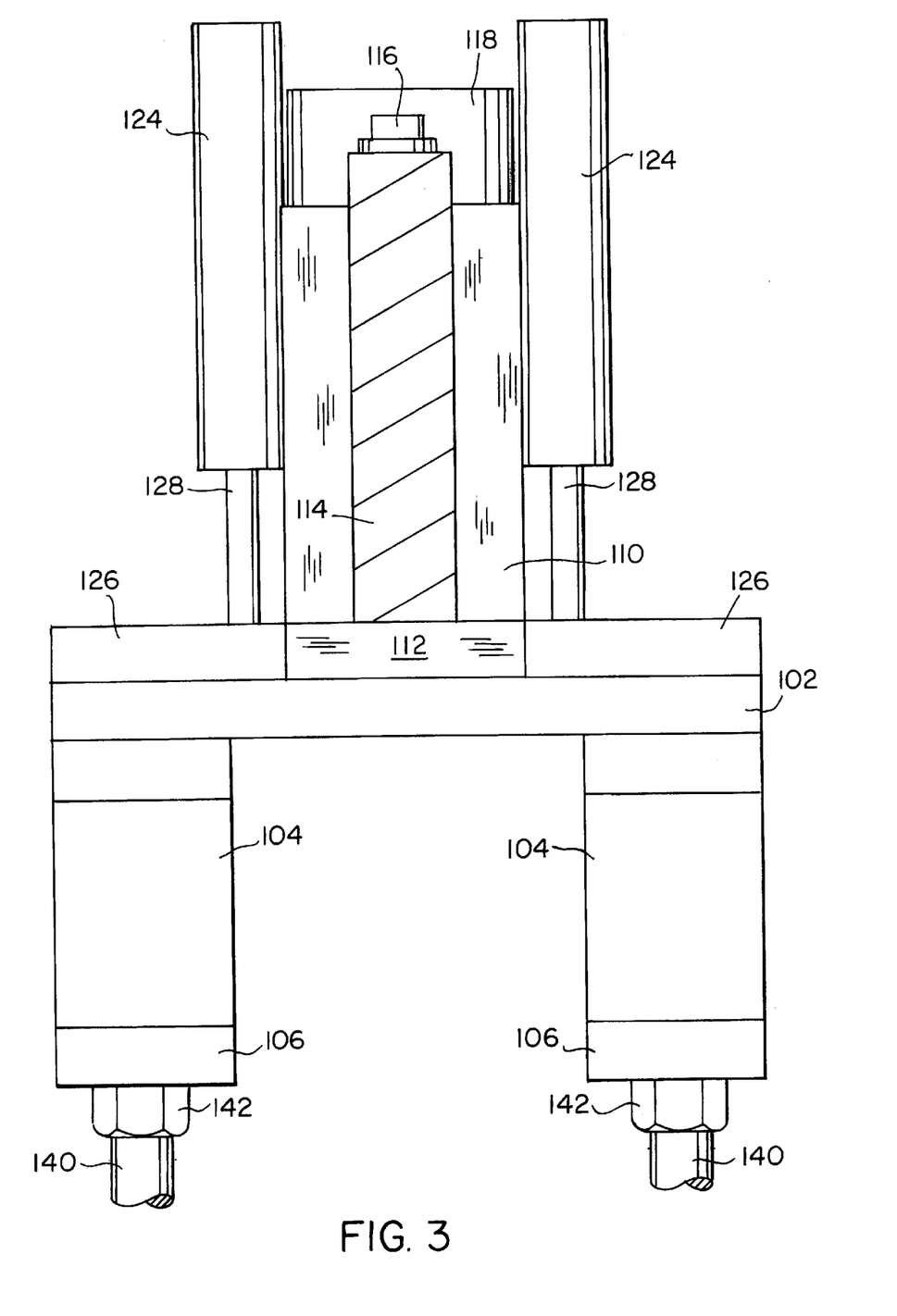
FIG. 3 is an illustration of a rear elevational view of the device illustrated in FIG. 1.

FIG. 3 illustrates a rear elevational view of the soldering device 100. As will be readily appreciated by one of ordinary skill in the art, many of the structures previously described with reference to FIGS. 1 and 2 are not directly visible in FIG. 3, and these structures have not been illustrated in phantom, in order to ease visualization of the soldering device.

Figures 4, 5A, 7A:
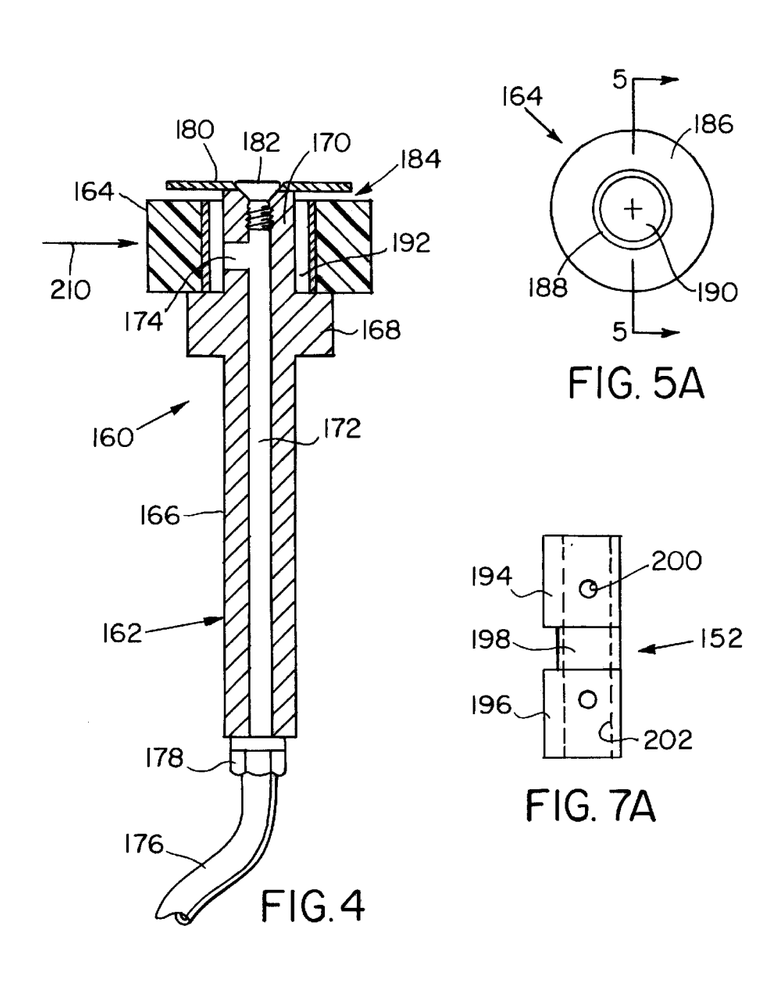
FIG. 4 is an illustration of a side view of a sensor in accordance with the present invention.
FIG. 5A is an illustration of a top plan view of a portion of the sensor illustrated in FIG. 4.
FIG. 7A is an illustration of a left side elevational view of an electrode holder shell in accordance with the present invention.
Figure 5B:
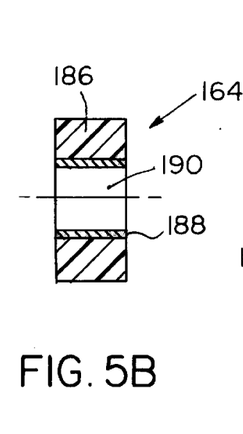
FIG. 5B is an illustration of a cross-sectional view of the portion of the sensor illustrated in FIG. 5A, taken at line 5—5.
Figure 6:
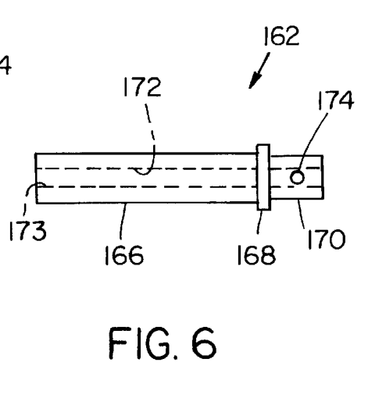
FIG. 6 is an illustration of a side elevational view of yet another portion of the sensor illustrated in FIG. 4.

FIGS. 4–6 illustrate a position sensor 160 usable as position sensor 146 in accordance with the present invention. FIG. 4 illustrates a side elevational view of the entire position sensor 160, while FIGS. 5A–6 illustrate views of some of the several components of the position sensor. As will be readily appreciated by one of ordinary skill in the art, other sensors are usable in the present invention as position sensor 146 which operate as a limit switch to generate a control signal when workpiece 148 is moved along the direction indicated by arrow 208 to engage the position sensor.

As illustrated in FIGS. 4–6, position sensor 160 includes a shaft 162 and a roller 164 which is mounted around one end of the shaft. Shaft 162 includes a first portion 166, a shoulder 168, and a second portion 170. A through bore or lumen 172 extends through the entire length of shaft 162, from a first port 173 at one end of the shaft to a second port 174 formed through the sidewall of second portion 170. Bore 172 can extend farther to the end of second portion 170, to facilitate attachment of roller 164 to shaft 162, described in greater detail below. An air hose 176 is attached to shaft 162 at port 173 with a suitable device, such as a nut 178.

Shoulder 168 extends out from the outer diameter of second portion 170, and optionally may extend out from the outer diameter of first portion 166. Stated differently, while FIGS. 4–6 illustrate first portion 166 and second portion 170 having approximately the same outer diameter, they can alternatively have different outer diameters, in which embodiment shoulder 168 can be or include the change in outer diameter between the first portion and the second portion, which preferably has a smaller outer diameter than the first portion.

Roller 164 includes a cylindrical outer piece 186, a cylindrical inner piece 188, and a through bore or lumen 190 which extends through the length of the roller. Preferably, outer piece 186 is constructed of a polymer, e.g., Delrin, and inner piece 188 is constructed of metal, e.g., brass. Roller 164 is mounted on second portion 170 of shaft 162, as illustrated in FIG. 4, and is held on the shaft by a washer 180 attached to the shaft with a screw 182. As discussed above, bore 172 can extend to the end of shaft 162 through second portion 170, and can be threaded to receive screw 182. Screw 182 extends into bore 172 to a point before second port 174, so as not to occlude the second port. Alternatively, screw 182 can be replaced with any other suitable attachment mechanism, such as adhesive, a bayonet fitting, or the like.

Roller 164 and shaft 162 are dimensioned so that, when assembled as illustrated in FIG. 4, an air gap 184 is present between the upper end of roller 164 and the lower surface of washer 180 (as illustrated in FIG. 4). Furthermore, bore 190 of roller 164 is dimensioned relative to the outer diameter of second portion 170 of shaft 162 so that an annular space 192 is present between the outer surface of the second portion and the inner surface of roller 164. Additionally, second port 174 is positioned along the length of shaft 162 so that, when assembled, the second port is in direct communication with annular space 192.

As will be readily appreciated by one of ordinary skill in the art, the series of air gap 184, annular space 192, second port 174, bore 172, first port 173, and air hose 176 form an air pathway through position sensor 160. Roller 164 is, however, free to move on shaft 162, and in particular on second portion 170, but will not fall off of the shaft because of washer 180. Roller 164 is therefore free to slide into contact with the outer surface of second portion 170 when an external force is exerted against the 10 roller, for example along the direction indicated by arrow 210, and can partially or completely block off the flow of air through second port 174, and therefore through the air passageway.

Position sensor 160 is therefore usable as position sensor 146, preferably in soldering device 100, by mounting position sensor 160 to extend into the space between base 102 and bracket 106 so that roller 164 will be pushed by workpiece 148 up against second portion 170 of shaft 162 to partially or completely occlude second port 174. By connecting air hose 176 to a source of air pressure, which includes a mechanism which can sense a rise in air pressure, when roller 164 is pushed up to second port 174, the air pathway which includes the second port, described above, is partially or completely blocked, which results in a rapid increase in the air pressure in air hose 176. This rise in air pressure can be used as a control signal to indicate that workpiece 148 has moved to a position immediately adjacent sensor 160, and therefore is in a predetermined position.

Figure 7B:
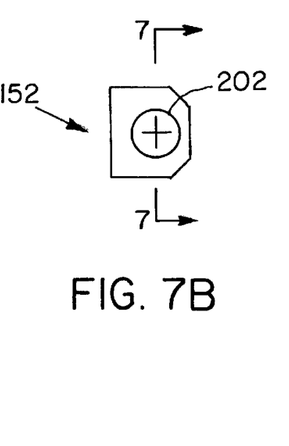
FIG. 7B is an illustration of a top plan view of the electrode holder shell illustrated in FIG. 7A.
Figure 7C:
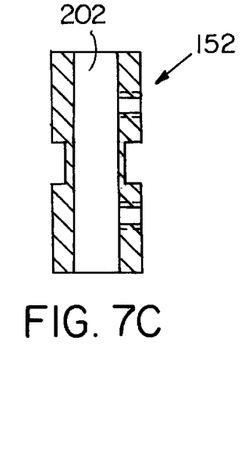
FIG. 7C is an illustration of a cross-sectional view of the electrode holder shell illustrated in FIGS. 7A and 7B, taken at line 7—7.

Turning now to FIGS. 7A–7C, an electrode holder shell 152 is illustrated. Electrode holder shell holds electrode 132 (see FIG. 2) to electrode air cylinder 124, as described above. Electrode holder shell 152 includes a first portion 194, a second portion 196 substantially similar to the first portion, and an intermediate portion 198 between the first and second portions. A through bore or lumen 202 extends through electrode holder shell 152, which has an inner diameter larger than the outer diameter of electrode 132, so that the electrode can be received in the bore. At least one, and preferably at least two, holes 200 are tapped through the sidewall of first portion 194 and second portion 196, to allow screws or other devices (not illustrated) to hold electrode 132 in electrode holder shell 152. Posts 154 attach to electrode holder shell 152, as illustrated in FIG. 2.

Air cylinders suitable for use as described herein are available from a number of manufacturers. Furthermore, each air cylinder includes a connection to a source of compressed air or other gas to actuate the cylinder, which are not illustrated in the drawing figures to aid in an understanding of the present invention. Similarly, each soldering electrode includes a connection to a voltage source for supplying the electrode with electrical energy to operate.

The operation of soldering device 100 will now be described with particular reference being made to FIGS. 1 and 2. In this exemplary process, reference will be made to the use of soldering device 100 to solder a pair of electrical contacts to a surface of an automobile window. While automobile windows are a preferred workpiece 148, other workpieces, including workpieces formed of metals and polymers, are also within the spirit and scope of the present invention.

When it is desired to solder an electrical contact to window 148, the contact is loaded into a clip (not illustrated), and the clip is placed on the bottom of clip holder 158. Window 148 is preferably held stationary by, e.g., a portion of an assembly line or some other clamping mechanism. An operator of soldering device 100 then maneuvers the soldering device, using hand grip 114, so that window 148 enters the space between base 102 and bracket 106, and the window moves at least in part along the direction indicated by arrow 208. The soldering device is advanced over the window until the leading edge of the window pushes up against position sensors 146, preferably position sensors 160. The position sensors then generate control signals, preferably a pneumatic control signal as described above, which indicates that the soldering device is properly positioned relative to the window. Bumpers 134 and 136 aid in this positioning step.

Once the soldering device and window are properly mutually positioned, as indicated by the control signal generated by position sensors 146, the operator presses actuator trigger or button 116, which initiates a controlled sequence of events. Clamp air cylinder first is actuated to move clamp bumper 138 upwardly against the window, and firmly clamps the window between the clamp bumper and bumpers 134, 136. Then, clip holder air cylinder 118 is actuated, which moves clip shunt bracket 120, clip holder 158, as well as the clip and electrical contacts, downward to place the electrical contacts on the surface of the window where it is desired to solder the contacts to the window. Then, the electrode air cylinders 124 are actuated, either sequentially or simultaneously, so that electrode tips 156 engage the electrical contacts. Electrical energy is then supplied to electrodes 132, which solders the electrical contacts to the window. The air cylinders are then retracted, and the soldering device can be moved relative to the window.

While this invention has been particularly shown and described with references to preferred embodiments thereof, it will be understood by those skilled in the art that various changes in form and details may be made therein without departing from the spirit and scope of the invention as defined by the appended claims. For example, only a single electrode can be employed, in which case only a single electrode air cylinder is required, or more than two electrodes can be provided, each with their own air cylinder. Additionally, one air cylinder can move all of the electrodes. Furthermore, although particular position sensors have been described, various suitable commercially available limit switches, proximity sensors and position sensors may be employed. Also, motor drives (for example, servo motors) may be employed instead of air operated cylinders for moving the various components. Finally, instead of a positive pressure clamp, a vacuum-type clamp can alternatively be used to clamp the workpiece in the soldering device.

What is claimed is:

1. A handholdable, air-operable soldering device, comprising:
   a base having a first surface;
   a bracket connected to said base and spaced from said base first surface;
   a clamping element mounted to said bracket and moveable toward said base; and
   a soldering electrode movably mounted to said base.

2. A soldering device in accordance with claim 1, further comprising at least one position sensor attached to a structure selected from the group consisting of said base and said bracket, said position sensor generating a control signal when a workpiece pushes against said position sensor.

3. A soldering device in accordance with claim 2, wherein said at least one position sensor comprises:
   a shaft including a sidewall, an exterior surface, and a bore, said bore having a first port and a second port and extending between said first port and said second port, said second port extending through said sidewall at a portion of said shaft having an outer diameter;
   a shoulder formed in said shaft exterior surface;
   a cylindrical roller having a bore therethrough, said bore having an inner diameter greater than said shaft outer diameter, said roller slidably positioned around said shaft adjacent to said shoulder and over said portion of said shaft having said outer diameter, said roller bore and said shaft exterior surface forming a space between them; and
   a restraining element extending from said shaft adjacent to but spaced apart from said roller, said restraining element and said roller forming an air gap therebetween;
   wherein said air gap, said space, said second port, said shaft bore, and said first port in series form an air passageway through said sensor, and wherein when said roller is pushed by an external force, said roller slides against said second port and at least partially occludes said air passageway.

4. A soldering device in accordance with claim 3, wherein said shoulder extends from said shaft exterior surface.

5. A soldering device in accordance with claim 3, wherein said restraining element comprises a washer mounted to said shaft.

6. A soldering device in accordance with claim 3, wherein said roller comprises an outer cylinder and an inner cylinder mounted in said outer cylinder.

7. A soldering device in accordance with claim 3, wherein said at least one position sensor comprises two spaced apart position sensors, each of said two spaced apart position sensors attached to a structure selected from the group consisting of said base and said bracket, each of said two spaced apart position sensors generating a control signal when a workpiece pushes against each of said two spaced apart position sensors.

8. A soldering device in accordance with claim 1, further comprising bumpers mounted to said base first surface.

9. A soldering device in accordance with claim 1, further comprising an electrode air cylinder attached to said electrode, said electrode air cylinder movable between an extended position in which said electrode is adjacent to said clamping element, and a retracted position in which said electrode is removed from said clamping element.

10. A soldering device in accordance with claim 9, wherein said soldering electrode is a first soldering electrode, and further comprising a second soldering electrode spaced from said first soldering electrode, said second soldering electrode being movably mounted to said base.

11. A soldering device in accordance with claim 10, wherein said electrode air cylinder is a first electrode air cylinder and further comprising a second electrode air cylinder attached to said second electrode, said second electrode air cylinder movable between an extended position in which said second electrode is adjacent to said clamping element, and a retracted position in which said second electrode is removed from said clamping element.

12. A soldering device in accordance with claim 1, further comprising a clip holder air cylinder mounted to said base and a clip holder attached to said clip holder air cylinder, said clip holder air cylinder movable between an extended position in which said clip holder is adjacent to said clamping element, and a retracted position in which said electrode is removed from said clamping element.

13. A soldering device in accordance with claim 1, further comprising a clamp air cylinder attached to said clamping element, said clamp air cylinder movable between an extended position in which said clamping element is adjacent to said base first surface, and a retracted position in which said clamping element is removed from said base first surface.

14. A soldering device in accordance with claim 13, wherein said clamping element is a first clamping element, and further comprising a second clamping element spaced from said first clamping element, said second clamping element mounted to said bracket and moveable toward said base.

15. A soldering device in accordance with claim 14, wherein said clamp air cylinder is a first clamp air cylinder and further comprising a second clamp air cylinder attached to said second clamping element, said second clamp air cylinder movable between an extended position in which said second clamping element is adjacent to said base first surface, and a retracted position in which said second clamping element is removed from said base first surface.

16. A soldering device comprising:
   a frame having first and second clamping surfaces, the second clamping surface being movable toward the first clamping surface for clamping an object therebetween;

a moveable component holder mounted to the frame for holding at least one electrical component, the holder capable of moving the at least one electrical component from a retracted position and into contact with the clamped object; and a soldering element movably mounted to the frame capable of moving into position for soldering the at least one electrical component to the clamped object.

17. The soldering device of claim 16 in which the soldering element is mounted to the frame opposite to the second clamping surface.

18. The soldering device of claim 20 in which the movable component holder is mounted to the frame opposite to the second clamping surface.

* * * * *

UNITED STATES PATENT AND TRADEMARK OFFICE
CERTIFICATE OF CORRECTION

PATENT NO. : 6,127,657
DATED : October 3, 2000
INVENTOR(S) : John P. Hendrick and Michael E. Wheaton

It is certified that error appears in the above-identified patent and that said Letters Patent is hereby corrected as shown below:

Claim 18, column 10, line 4, delete "20" and insert ---16---.

Signed and Sealed this

Eighth Day of May, 2001

Attest:

NICHOLAS P. GODICI

Attesting Officer

Acting Director of the United States Patent and Trademark Office